(12) United States Patent
Otsubo

(10) Patent No.: US 10,158,130 B2
(45) Date of Patent: Dec. 18, 2018

(54) HIGH-PRESSURE TANK

(71) Applicant: TOYOTA JIDOSHA KABUSHIKI KAISHA, Toyota-shi, Aichi-ken (JP)

(72) Inventor: Hirokazu Otsubo, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/285,765

(22) Filed: Oct. 5, 2016

(65) Prior Publication Data

US 2017/0104227 A1    Apr. 13, 2017

(30) Foreign Application Priority Data

Oct. 8, 2015  (JP) ................................ 2015-200364
Apr. 6, 2016  (JP) ................................ 2016-076384

(51) Int. Cl.
*H01M 8/04082*    (2016.01)
*B32B 5/26*         (2006.01)
(Continued)

(52) U.S. Cl.
CPC ......... *H01M 8/04208* (2013.01); *B32B 5/26* (2013.01); *B32B 27/12* (2013.01); *B32B 27/34* (2013.01);
(Continued)

(58) Field of Classification Search
CPC .......... H01M 8/04208; H01M 2250/20; B32B 27/34; B32B 27/12; B32B 5/26;
(Continued)

(56) References Cited

U.S. PATENT DOCUMENTS 3,317,074 A * 5/1967 Long .................. F17C 3/06
                                                     138/149
3,598,275 A * 8/1971 Francois ............. B65D 90/02
                                                     114/341
(Continued)

FOREIGN PATENT DOCUMENTS

JP    2008-126615 A    6/2008
JP    2008-286297       11/2008
(Continued)

*Primary Examiner* — Kareen Thomas
(74) *Attorney, Agent, or Firm* — Finnegan, Henderson, Farabow, Garrett & Dunner, LLP

(57) ABSTRACT

In a high-pressure tank including a reinforcement layer and a protective layer, using the same resin for the reinforcement layer and the protective layer is likely to cause bubbles produced in the course of curing the resin to remain on the surface of the tank. There is also a possibility that cloudiness occurs on the surface of the tank during the use of the high-pressure tank. There is accordingly provided a high-pressure tank, comprising a liner; a reinforcement layer formed on the liner and including a thermosetting first resin and a fiber; and a protective layer formed on the reinforcement layer and including a thermosetting second resin. A second gelation temperature that is a gelation temperature of the second resin is higher than a first gelation temperature that is a gelation temperature of the first resin. A viscosity of the second resin is lower than a viscosity of the first resin at the first gelation temperature.

4 Claims, 3 Drawing Sheets

(51) Int. Cl.
*B32B 27/12* (2006.01)
*B32B 27/34* (2006.01)
*F17C 1/06* (2006.01)

(52) U.S. Cl.
CPC .......... *F17C 1/06* (2013.01); *B32B 2260/023* (2013.01); *B32B 2260/046* (2013.01); *B32B 2262/101* (2013.01); *B32B 2262/106* (2013.01); *B32B 2307/7242* (2013.01); *B32B 2439/40* (2013.01); *B32B 2457/18* (2013.01); *F17C 2201/0104* (2013.01); *F17C 2203/0604* (2013.01); *F17C 2203/0621* (2013.01); *F17C 2203/0663* (2013.01); *F17C 2221/012* (2013.01); *F17C 2260/011* (2013.01); *F17C 2270/0184* (2013.01); *H01M 2250/20* (2013.01); *Y02T 90/32* (2013.01)

(58) Field of Classification Search
CPC ...... B32B 2262/101; B32B 2307/7242; B32B 2262/106; B32B 2260/046; B32B 2260/023; B32B 2457/18; B32B 2439/40; F17C 1/06; F17C 2203/0621; F17C 2203/0663; F17C 2221/012; F17C 2203/0604; F17C 2201/0104; F17C 2270/0184; F17C 2260/011; Y02T 90/32
USPC ............. 220/581–591, 562–564, 565–567.3, 220/4.12–4.15, 905
See application file for complete search history.

(56) References Cited

U.S. PATENT DOCUMENTS

| | | | |
|---|---|---|---|
| 5,429,845 A * | 7/1995 | Newhouse | F17C 1/16 138/30 |
| 5,806,457 A * | 9/1998 | Gauthier | B63B 3/13 114/312 |
| 7,032,769 B2 * | 4/2006 | Iida | B29C 53/8016 220/591 |
| 8,308,017 B2 * | 11/2012 | Schlag | F16J 12/00 220/586 |
| 2009/0236349 A1 | 9/2009 | Mueller et al. | |
| 2010/0025412 A1 * | 2/2010 | Wakao | B29C 53/8083 220/590 |
| 2011/0146877 A1 * | 6/2011 | Tanaka | B60C 1/00 152/547 |
| 2011/0303662 A1 | 12/2011 | Handa | |
| 2013/0087567 A1 * | 4/2013 | Kaneko | F17C 1/06 220/590 |
| 2015/0014332 A1 * | 1/2015 | Nishibu | F17C 1/02 220/586 |

FOREIGN PATENT DOCUMENTS

| | | |
|---|---|---|
| JP | 2010-503801 A | 2/2010 |
| JP | 2010-90938 | 4/2010 |
| JP | 5116807 B2 | 1/2013 |
| KR | 2008-0113212 A | 12/2008 |

* cited by examiner

HIGH-PRESSURE TANK

CROSS-REFERENCE TO RELATED APPLICATIONS

The present application claims priority to Japanese patent application P2015-200364 filed on Oct. 8, 2015, and Japanese patent application P2016-076384 filed on Apr. 6, 2016, the contents of which are hereby incorporated by reference into this application.

BACKGROUND

Field

The present disclosure relates to a high-pressure tank.

Related Art

A proposed high-pressure tank filled with a fluid such as hydrogen gas at high pressure is a high-pressure tank including a liner, a reinforcement layer that is formed on the surface of the liner from a fiber reinforced resin using carbon fiber or the like, and a protective layer that is formed on the surface of the reinforcement layer from a fiber reinforced resin using glass fiber or the like (JP 2010-90938A).

In the proposed high-pressure tank including the reinforcement layer and the protective layer, the same resin having high elongation and high toughness may be used for both the reinforcement layer and the protective layer, in terms of ensuring the strength of the tank. In this high-pressure tank, however, gas included in the resin may remain in the form of bubbles on the surface of the tank in the process of curing the resin. There is also a possibility that cloudiness occurs on the surface of the tank during the use of the high-pressure tank.

SUMMARY

In order to solve at least part the problems described above, the disclosure may be implemented by aspects described below.

(1) According to one aspect of the disclosure, there is provided a high-pressure tank. This high-pressure tank may comprise a liner; a reinforcement layer formed on the liner and including a thermosetting first resin and a fiber; and a protective layer formed on the reinforcement layer and including a thermosetting second resin. A second gelation temperature that is a gelation temperature of the second resin may be higher than a first gelation temperature that is a gelation temperature of the first resin. A viscosity of the second resin may be lower than a viscosity of the first resin at the first gelation temperature.

The protective layer may be formed from only the second resin (that may contain an additive) or may be formed from a composite material of the second resin, and a fiber (i.e., a fiber-reinforced resin).

In the high-pressure tank of this aspect, the gelation temperature of the thermosetting resin used to form the protective layer is higher than the gelation temperature of the thermosetting resin used to form the reinforcement layer. When the resins of the protective layer and the reinforcement layer are simultaneously heated to be cured, the protective layer is cured at a slower rate than the reinforcement layer. The viscosity of the resin included in the protective layer is lower than the viscosity of the resin included in the reinforcement layer at the gelation temperature of the resin included in the reinforcement layer. This configuration causes the gas remaining inside of the resin to be discharged outside from the protective layer in the process of curing the reinforcement layer. This results in discharging a large amount of gas until completion of curing. This configuration accordingly suppresses the bubbles from remaining on the surface of the high-pressure tank and improving the surface properties.

(2) The high-pressure tank of the above aspect may comprise a cylindrical portion in an approximately cylindrical, shape. A breaking strain of the first resin may be larger than a reference strain that is a tensile strain occurring in a direction of a center axis of the cylindrical portion of the high-pressure tank in a predetermined pressure test of the high-pressure tank, and a breaking strain of the second resin may be smaller than the reference strain. This configuration causes the protective layer to have small cracking by a predetermined pressure test performed prior to shipment of the high-pressure tank. As a result, this configuration causes the gas included in the high-pressure tank and transmitted through the liner and the reinforcement layer to be discharged out of the high-pressure tank via the small cracking of the protective layer during the use of the high-pressure tank, thereby suppressing cloudiness on the surface of the high-pressure tank.

(3) In the high-pressure tank of the above aspect, the fiber of the reinforcement layer may be carbon fiber. In other words, the reinforcement layer may be formed from a carbon fiber reinforced resin that is a composite material of carbon fiber and the first resin. This configuration provides the high-pressure tank having the high pressure resistance.

(4) In the high-pressure tank of the above aspect, the protective layer may further include glass fiber or aramid fiber. In other words, the protective layer may be formed from a fiber reinforced resin that is a composite material of glass fiber or aramid fiber and the second resin. This configuration provides the high-pressure tank having the high resistance to an external impact.

All the plurality of components included in each of the aspects of the disclosure described above are not essential, but some components among the plurality of components may be appropriately changed, omitted or replaced with other additional components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the disclosure described above may be combined with part or all of the technical features included in another aspect of the disclosure described above to provide one independent aspect of the disclosure.

The present disclosure may be implemented by any of various other aspects, for example, a fuel cell system equipped with the high-pressure tank or a moving body with the fuel cell system mounted thereon.

DESCRIPTION OF EMBODIMENTS

A. First Embodiment

A1. Configuration of High-Pressure Tank

Figure 1:
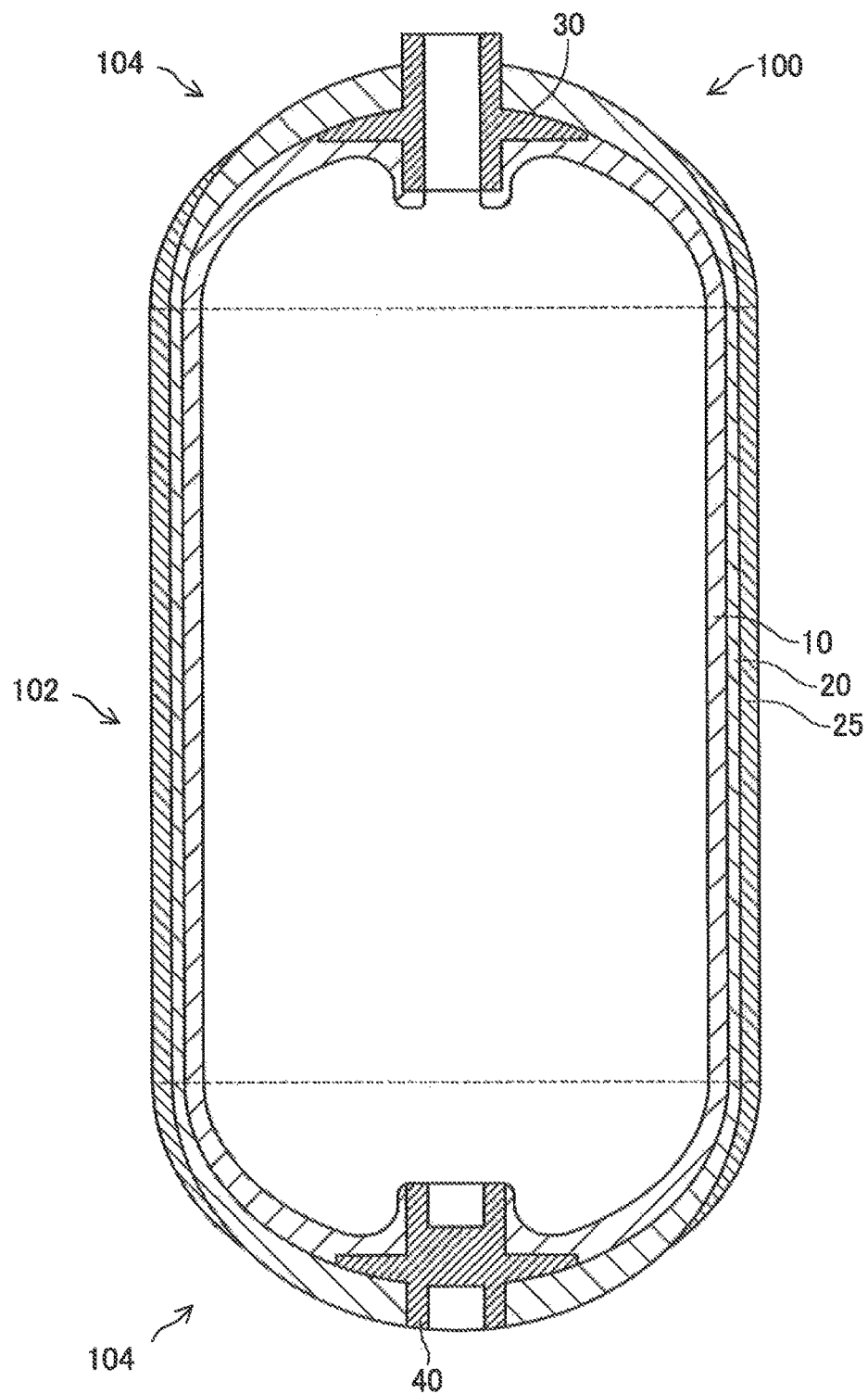
FIG. 1 is a sectional view illustrating the schematic configuration of a high-pressure tank according to one embodiment.

FIG. 1 is a sectional view illustrating the schematic configuration of a high-pressure tank 100 according to one embodiment. In this embodiment, the high-pressure tank 100 may be filled with, for example, compressed hydrogen. The high-pressure tank 100 may be mounted on, for example, a fuel cell vehicle to supply hydrogen to a fuel cell. The high-pressure tank 100 is, however, not necessarily mounted on the fuel cell vehicle but may be mounted on any of other vehicles such as an electric vehicle or a hybrid vehicle and may be mounted on any of other moving bodies such as a ship or boat, an airplane or a robot. The high-pressure tank 100 may also be installed in stationary equipment such as a house or a building.

The high-pressure tank 100 may be a hollow container including a cylindrical portion 102 in an approximately cylindrical shape and dome portions 104 in an, approximately hemispherical shape provided integrally with both ends of the cylindrical portion 102. Boundaries between the cylindrical portion 102 and the dome portions 104 are shown by the broken line in FIG. 1. The high-pressure tank 100 may include a liner 10, a reinforcement layer 20, a protective layer 25, a mouthpiece 30 and a mouthpiece 40. In the description below, the liner 10 equipped with the mouthpiece 30 and the mouthpiece 40 may be referred to as "tank main body".

The liner 10 is formed from a nylon resin and has blocking properties (gas harrier properties) to prevent hydrogen filled in the inner space thereof from leaking outside. The liner 10 may, however, be formed from another synthetic resin having the gas barrier properties, for example, a polyethylene resin, or a metal, for example, stainless steel.

The reinforcement layer 20 is formed to cover the outer surface of the tank main body. More specifically, the reinforcement layer 20 is formed to cover the entire outer surface of the liner 10 and part of the mouthpieces 30 and 40. The reinforcement layer 20 is formed from a carbon fiber reinforced plastic (CFRP) that is a composite material of a thermosetting first resin and carbon fiber and has pressure resistance. According to this embodiment, the first resin used is an epoxy resin that includes an amine-based or anhydrous curing accelerator and a rubber-based reinforcing agent. The first resin is, however, not necessarily limited to the epoxy resin but may be another thermosetting resin, for example, an unsaturated polyester resin. The properties (performance) of the first resin will be described later.

The protective layer 25 is formed on the reinforcement layer 20. The protective layer 25 is formed from a glass fiber reinforced plastic (GFRP) that is a composite material of a thermosetting second resin and glass fiber and has higher impact resistance than the reinforcement layer 20. According to this embodiment, the second resin used is an epoxy resin, that includes less amounts of the curing accelerator and the reinforcing agent than those of the first resin or that does not include the curing accelerator or the reinforcing agent, in order to provide the different properties (performance) from those of the first resin. The second resin is, however, not necessarily limited to the epoxy resin but may be another thermosetting resin, for example, an unsaturated polyester resin. The properties (performance) of the second resin will be described later.

The mouthpieces 30 and 40 are respectively attached to two opening ends of the liner 10. The mouthpiece 30 serves as an opening of the high-pressure tank 100 and also serves as a mounting structure used for mounting a pipe and a valve to the tank main body. The mouthpieces 30 and 40 also serve mounting structures used for attachment of the tank main body to a filament winding apparatus to form the reinforcement layer 20 and the protective layer 25.

The reinforcement layer 20 and the protective layer 25 may be formed by, for example, a method described below. A tank main body is provided by mounting the mouthpieces 30 and 40 to the liner 10 (step S12). The carbon fiber impregnated with the first resin is wound on the tank main body that is used as a mandrel by a predetermined number of windings, and the glass fiber impregnated with the second resin is subsequently wound on the windings of the carbon fiber by a predetermined number of windings (step S14). In the description below, a half-finished product produced at step S14 is called "coated tank main body". The coated tank main body is then placed in a heating furnace and is heated for about two hours at a gelation temperature of the first resin (for example, about 80 to 100° C.) (step S16). The temperature is subsequently raised to a gelation temperature of the second resin (for example, about 120 to 140° C.), and the coated tank main body is further heated for about two hours (step S18). This process cures the epoxy resins to form the reinforcement layer 20 and the protective layer 25.

In the process of forming the reinforcement layer 20 and the protective layer 25, gases are present inside of the reinforcement layer 20 and the protective layer 25. The gases may include the air contained in the epoxy resins themselves, the air trapped during winding of fiber bundles, and gases produced by the curing reaction of the epoxy resins. These gases are transmitted through the epoxy resin in the liquid form to be discharged outside in the process of forming the reinforcement layer 20 and the protective layer 25.

Figure 2:
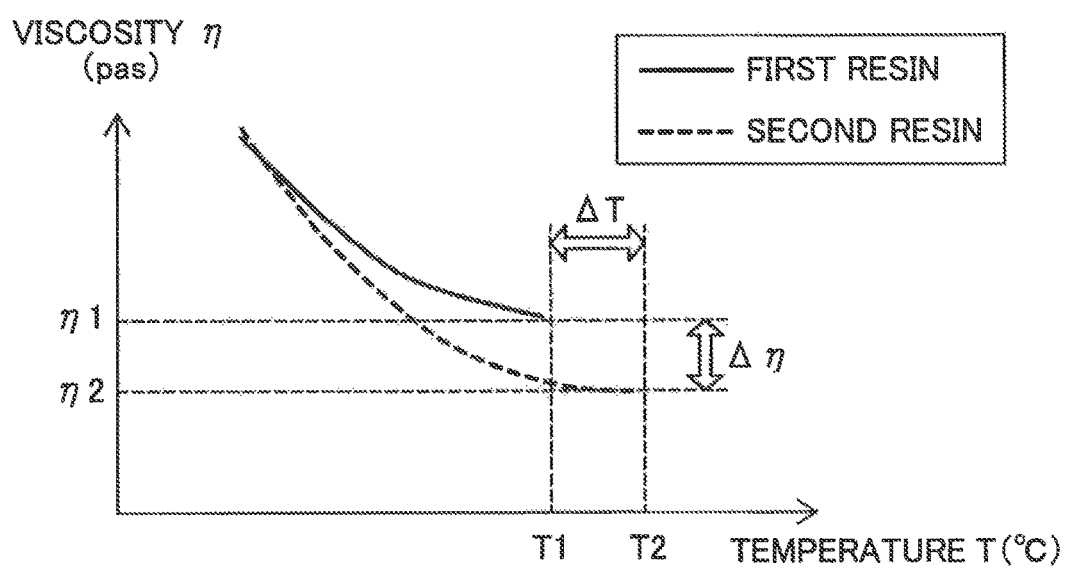
FIG. 2 is a chart showing temperature-viscosity characteristics of a first resin and a second resin.

FIG. 2 is a chart showing temperature-viscosity characteristics of the first resin and the second resin. FIG. 2 is a single logarithmic graph having a viscosity axis shown by logarithmic scale. A second gelation temperature T2 that denotes the gelation temperature of the second resin is higher than a first gelation temperature T1 that denotes the gelation temperature of the first resin. At the first gelation temperature T1, a viscosity η2 of the second resin is lower than a viscosity η1 of the first resin. The first gelation temperature T1 and the second gelation temperature T2 should satisfy the relationship of first gelation temperature T1<second gelation temperature T2. For example, the first gelation temperature T1 may be about 80 to 100° C., and the second gelation temperature T2 may be about 100 to 120° C. A temperature difference ΔT between the first gelation temperature T1 and the second gelation temperature T2 may be, for example, about 10 to 30° C. This temperature difference ΔT facilitates release of the gases included in the first resin and the second resin to outside in the process of curing the first resin and the second resin. The viscosity η1 of the first resin and the viscosity η2 of the second resin at the first gelation temperature T1 should satisfy the relationship of viscosity η2 of the second resin<viscosity η1 of the first resin. For example, the viscosity η1 of the first resin at the first gelation temperature T1 may be about 0.2 to 0.3 Pas, and the viscosity η2 of the second resin at the first gelation temperature T1 may be about 0.08 to 0.1 Pas. A viscosity difference Δη between the viscosity η1 of the first resin and the viscosity η2 of the second resin may be, for example, about 0.1 to 0.3 Pas. This viscosity difference Δη facilitates release of the gases included in the first resin and the second resin to outside in the process of curing the first resin and the second resin.

The high-pressure tank 100 of the embodiment is obtained by winding the carbon fiber impregnated with the liquid first resin on the liner 10, subsequently winding the glass fiber impregnated with the liquid second resin on the windings of the carbon fiber and heating the liner 10 with the windings of the fiber bundles to cure the first resin and the second resin, as described above. The gelation temperature T2 of the second resin is higher than the gelation temperature T1 of the first resin, so that the second resin is cured at a slower rate than the first resin, in other words, the second resin has not yet been gelated when the first resin has been gelated. The gas included in the reinforcement layer 20, for example, the gas produced in the curing process of the reinforcement layer 20 may thus be readily released outside via the liquid second resin of the protective layer 25. At the gelation temperature T1 of the first resin, the viscosity η2 of the second resin is lower than the viscosity η1 of the first resin. The lower viscosity of the resin has the higher probability of releasing the gas, so that the gas included in the reinforcement layer 20 may be readily released outside through the protective layer 25. As shown in FIG. 2, the viscosity of the first resin and the viscosity of the second resin respectively decrease with increases in temperature up to the respective gelation temperatures. The lower viscosity of the resin has the higher probability of releasing the gas, but the gas is unlikely to be released after gelation of the resin. In the case where the viscosity η2 of the second resin is lower than the viscosity η1 of the first resin at the first gelation temperature T1, the gas included in the reinforcement layer 20 may be readily discharged from the protective layer 25 that is close to the surface, before the first resin is gelated.

For example, when the epoxy resin of the same properties (the same gelation temperature and viscosity) is used for the reinforcement layer 20 and the protective layer 25, the reinforcement layer 20 and the protective layer 25 are gelated simultaneously. The gas included in the reinforcement layer 20 that is placed on the inner side of the protective layer 25 is unlikely to be readily discharged but is likely to remain in the form of bubbles on the surface of the tank. In the case where the viscosity of the second resin is higher than the viscosity of the first resin at the gelation temperature of the first resin, the gas included in the reinforcement layer 20 is likely to be accumulated between the reinforcement layer 20 and the protective layer 25. In the high-pressure tank 100 of the embodiment, on the other hand, the second resin used to form the protective layer 25 and the first resin used to form the reinforcement layer 20 are both the thermosetting epoxy resins but have different gelation temperatures and different viscosities as described above. This configuration enhances the defoaming property and thereby improves the surface properties compared with the configuration having bubbles remaining on the surface of the tank. This is expected to improve the assembly of the tank to the vehicle and the visibility of a label placed between the reinforcement layer 20 and the protective layer 25. This configuration also does not require any process to remove the bubbles remaining on the surface of the tank and thereby reduces the man hour in manufacture of the high-pressure tank.

A tensile strain occurring in the direction of the center axis of the cylindrical portion 102 after a predetermined pressure test of the high-pressure tank 100 is specified as reference strain εs. A breaking strain (tensile breaking strain) ε1 of the first resin is larger than the reference strain εs, while a breaking strain (tensile breaking strain) ε2 of the second resin is smaller than the reference strain εs. The predetermined pressure test herein is a test necessarily performed prior to shipment of the high-pressure tank 100 and denotes a pressure test performed for a tank having the normal operation pressure of 701 MPa to increase the internal pressure of the tank to about 105 MPa according to this embodiment. The reference strain εs in this pressure test is about 0.34%. The reference strain εs is, however, not necessarily limited to this value but may be 0.30 to 0.40%. The predetermined pressure test is not necessarily limited to the pressure test performed according to this embodiment. The tensile strain after any required predetermined pressure test may be specified as the reference strain εs. For example, the internal pressure of the tank in the pressure test may be set arbitrarily in a range of 70 to 140 MPa.

The breaking strain ε1 of the first resin and the breaking strain ε2 of the second resin may be measured by the following method. A test piece of each single resin for tensile test is provided and is tested by a tensile test. The elongation of the test piece is measured by a non-contact-type extensometer, and the tensile strain is calculated from the measured elongation. According to this embodiment, the non-contact-type extensometer may be used to draw lines at an edge of a weakest region of the test piece with a marker and measure the interval of the lines with an image sensor such as a CCD (charge coupled device) camera. The tension rate may be 0.2 mm/min. The tensile strain when the test piece is broken in the tensile test, i.e., the maximum strain applied to the test piece in the tensile test, is specified as the breaking strain.

Figure 3:
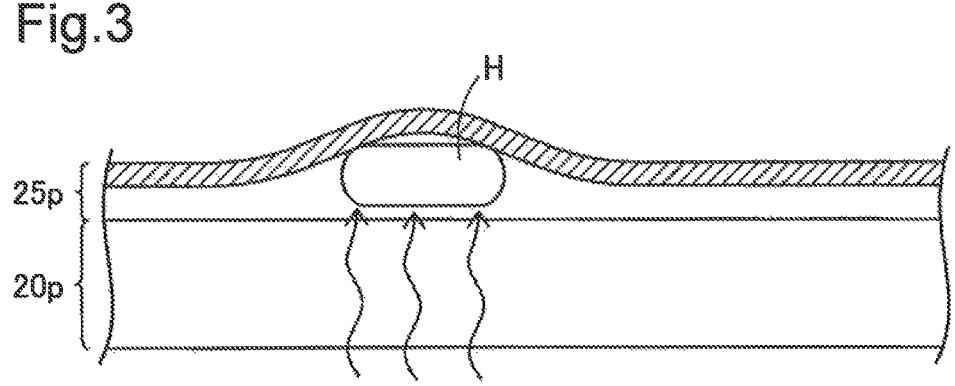
FIG. 3 is a diagram conceptually illustrating the occurrence of cloudiness in a high-pressure tank of a comparative example.
Figure 3:
Figure 3:
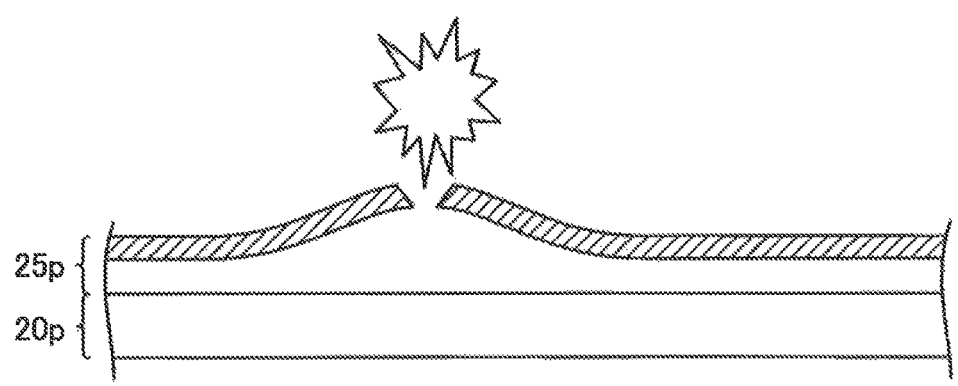

FIG. 3 is a diagram conceptually illustrating the occurrence of cloudiness in a high-pressure tank of a comparative example. In the high-pressure tank of the comparative example, a reinforcement layer 20p made of CFRP and a protective layer 25p made of GFRP respectively include an epoxy resin having the same properties. The epoxy resin used for the reinforcement layer 20p and the protective layer 25p of the comparative example has a large breaking strain to ensure the strength of the tank. For example, the epoxy resin used in the comparative example may be the epoxy resin identical with the first resin of the embodiment. FIG. 3 illustrates the section of part of the reinforcement layer 20p and the protective layers 5p in close-up.

A trace amount of the gas (for example, hydrogen) filled in the high-pressure tank of the comparative example is likely to be transmitted through the liner 10 and further transmitted through the reinforcement layer 20p. The protective layer 25p has a large breaking strain, so that the surface layer of the protective layer 25p is elongated by the transmitted gas as shown by the upper drawing of FIG. 3. The transmitted gas is not discharged by such elongation of the surface layer of the protective layer 25p. Increased accumulation of the transmitted gas in the continued use of the high-pressure tank is likely to elongate and eventually break the surface of the protective layer 25p and cause cloudiness (as shown by the lower drawing of FIG. 3)

Figure 4:
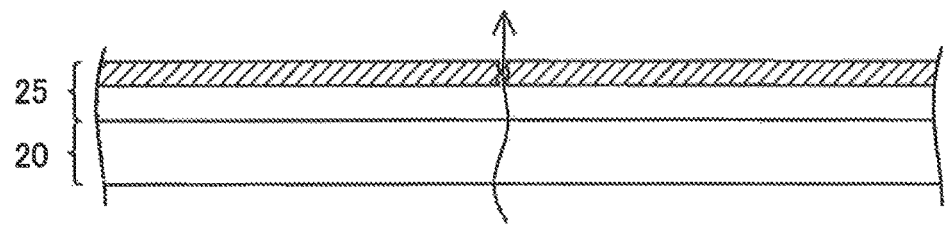
FIG. 4 is a diagram conceptually illustrating suppression of cloudiness occurring in the high-pressure tank of the embodiment.

FIG. 4 is a diagram conceptually illustrating suppression of cloudiness occurring in the high-pressure tank 100 of the embodiment. The high-pressure tank 100 of the embodiment satisfies the relationship of breaking strain ε1 of the first resin>reference strain εs>breaking strain ε2 of the second resin, so that the predetermined pressure test for measuring the reference strain εs is likely to cause cracking in the protective layer 25. As described above, the predetermined pressure test is necessarily performed prior to shipment of the high-pressure tank 100, so that the protective layer 25 has already had cracking before the use of the high-pressure tank 100. When the gas filled in the high-pressure tank 100 is transmitted through the liner 10 and the reinforcement layer 20 during the use of the high-pressure tank 100, the transmitted gas is released out of the high-pressure tank 100 through the cracking of the protective layer 25. This results in suppressing cloudiness that is caused by elongation and eventual breakage of the protective layer 25 by the transmitted gas. Because of the relationship of reference strain εs<breaking strain ε1 of the first resin, the reinforcement layer 20 has, on the other hand, no cracking after the predetermined pressure test performed prior to shipment. This configuration of the high-pressure tank 100 of the embodiment forcibly causes small cracking in the protective layer 25 prior to shipment in order to suppress the occurrence of cloudiness on the surface of the high-pressure tank 100, while ensuring the gas barrier properties by the liner 10 and the reinforcement layer 20. This accordingly reduces the noise caused by the occurrence of cloudiness.

B. Modifications

The present disclosure is not limited to any of the embodiments and the configurations described above but may be implemented by a diversity of other configurations without departing from the scope of the disclosure. Some examples of possible modifications are given below.

(1) The fluid contained in the high-pressure tank 100 is not necessarily limited to the compressed hydrogen described above but may be any high-pressure fluid, for example, compressed nitrogen.

(2) The fibers included in the reinforcement layer 20 and the protective layer 25 may be any of various fibers that are usable to form a fiber reinforced resin, for example, carbon fiber, glass fiber, aramid fiber, Dyneema (registered trademark of DSM Dyneema) fiber, Zylon (registered trademark of TOYOBO CO., LTD.) fiber, and boron fiber. The fibers may be selected to provide the reinforcement layer 20 with the pressure resistance and to provide the protective layer 25 with the higher impact resistance than that of the reinforcement layer 20. Carbon fiber may be used as the fiber of the reinforcement layer 20, and glass fiber or aramid fiber may be used as the fiber of the protective layer 25. This advantageously provides the reinforcement layer 20 with the high pressure resistance and provides the protective layer 25 with the higher impact resistance than that of the reinforcement layer 20.

One of the reinforcement layer 20 and the protective layer 25 may be formed from a fiber-reinforced resin, and the other may be formed from only a resin (that is not fiber-reinforced). According to a modification, the reinforcement layer 20 may be formed from a glass fiber reinforced resin that is the composite material of the first resin and the glass fiber, while the protective layer 25 may be formed from only the second resin. According to another modification, both the reinforcement layer 20 and the protective layer 25 may be formed from only resins (that are not fiber-reinforced). In the latter case, a resin having a desired level of pressure resistance may be selected for the reinforcement layer 20, and a resin having a desired level of impact resistance that is higher than the impact resistance of the reinforcement layer 20 may be selected for the protective layer 25. When the reinforcement layer 20 or the protective layer 25 is formed from only a resin, the reinforcement layer 20 or the protective layer 25 may be formed by spraying a resin by any known technique, for example, spray coating and subsequently heating the resin. For example, when the protective layer 25 of the above embodiment is formed from only the second resin, the reinforcement layer 20 and the protective layer 25 may be formed by winding the carbon fiber impregnated with the first resin on the liner 10, spraying the second resin on the windings of the carbon fiber by a known technique such as spray coating and subsequently heating the second resin-sprayed liner 10 with the windings of the carbon fiber to cure the first resin and the second resin.

(3) The above embodiment uses the same type of resins (epoxy resins) having different characteristics for the first resin and the second resin. According to a modification, different types of thermosetting resins may be used for the first resin and the second resin. For example, the first resin may be an unsaturated polyester resin, and the second resin may be an epoxy resin, or vice versa. Even in the case where different types of resins are used for the first resin and the second resin, satisfying the relationship of first gelation temperature T1<second gelation temperature T2 and the relationship of viscosity η1 of the first resin>viscosity η2 of the second resin at the first, gelation temperature T1 suppresses the bubbles from remaining on the surface of the tank.

(4) The above embodiment may not necessarily satisfy the relationship of breaking strain ε1 of the first resin>reference strain εs>breaking strain ε2 of the second resin. Even such modification at least suppresses the bubbles from remaining on the surface of the high-pressure tank 100 and improves the surface properties.

(5) The method of manufacturing the reinforcement layer 20 and the protective layer 25 is not necessarily limited to the above embodiment. The heating temperature and the heating time may be appropriately changed according to, for example, the types of the resins used and the configuration of the tank. The temperature rise profile may be a step-like profile of three or more steps or may be a linear profile with time.

The disclosure is not limited to any of the embodiment, the examples and the modifications described above but may be implemented by a diversity of other configurations without departing from the scope of the disclosure. For example, the technical features of any of the embodiment, the examples and the modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A high-pressure tank, comprising:
a liner;
a reinforcement layer formed on the liner and including a thermosetting first resin and a fiber; and
a protective layer formed on the reinforcement layer and including a thermosetting second resin,
wherein a second gelation temperature that is a gelation temperature of the second resin is higher than a first gelation temperature that is a gelation temperature of the first resin, and
a viscosity of the second resin is lower than a viscosity of the first resin at the first gelation temperature.

2. The high-pressure tank according to claim 1,
the high-pressure tank comprising a cylindrical portion in an approximately cylindrical shape, wherein
a breaking strain of the first resin is larger than a reference strain that is a tensile strain occurring in a direction of a center axis of the cylindrical portion of the high-pressure tank in a predetermined pressure test of the high-pressure tank, and a breaking strain of the second resin is smaller than the reference strain.

3. The high-pressure tank according to claim 1,
wherein the fiber of the reinforcement layer is carbon fiber.

4. The high-pressure tank according to claim 3,
wherein the protective layer further includes glass fiber or aramid fiber.

* * * * *